US009873638B2

(12) United States Patent
Ginn et al.

(10) Patent No.: US 9,873,638 B2
(45) Date of Patent: Jan. 23, 2018

(54) SYNTHETIC GYPSUM FERTILIZER PRODUCT AND METHOD OF MAKING

(71) Applicants: Terrell Dallas Ginn, Milton, KY (US); Danny Lynn Gray, Marietta, GA (US)

(72) Inventors: Terrell Dallas Ginn, Milton, KY (US); Danny Lynn Gray, Marietta, GA (US)

(73) Assignee: SUL4R-PLUS, LLC, Louisville, KY (US)

( * ) Notice: Subject to any disclaimer, the term of this patent is extended or adjusted under 35 U.S.C. 154(b) by 0 days.

(21) Appl. No.: 13/962,903

(22) Filed: Aug. 8, 2013

(65) Prior Publication Data

US 2015/0027181 A1    Jan. 29, 2015

Related U.S. Application Data

(60) Provisional application No. 61/681,088, filed on Aug. 8, 2012.

(51) Int. Cl.
    *C05D 3/00*    (2006.01)
    *C05D 3/02*    (2006.01)
    *C05G 3/00*    (2006.01)
    *G05G 3/00*    (2006.01)

(52) U.S. Cl.
    CPC .............. *C05D 3/00* (2013.01); *C05D 3/02* (2013.01); *C05G 3/0058* (2013.01); *C05G 3/0088* (2013.01); *G05G 3/00* (2013.01)

(58) Field of Classification Search
    USPC .......................................................... 71/63
    See application file for complete search history.

(56) References Cited

U.S. PATENT DOCUMENTS

| 4,015,972 | A | * | 4/1977 | Watkins et al. .................... 71/31 |
| 4,028,088 | A | * | 6/1977 | Young ....................... C05C 1/00 |
|           |   |   |        | 423/396 |
| 4,954,134 | A | * | 9/1990 | Harrison et al. ............ 23/313 R |
| 5,078,779 | A | * | 1/1992 | Van de Walle et al. .......... 71/63 |
| 6,029,603 | A |   | 2/2000 | Evans et al. |
| 6,287,356 | B1 |  | 9/2001 | Wommack et al. |
| 6,413,291 | B1 |  | 7/2002 | Wommack et al. |
| 6,613,138 | B2 |  | 9/2003 | Welshimer et al. |
| 7,776,124 | B2 |  | 8/2010 | Binder et al. |
| 2001/0029762 | A1 | * | 10/2001 | Steele et al. ...................... 71/63 |

(Continued)

OTHER PUBLICATIONS

"Kelly Limestone: Capsulated Limestone and Gypsum Pellet Products—Feb. 18, 2012".

(Continued)

*Primary Examiner* — Wayne Langel
(74) *Attorney, Agent, or Firm* — Moore & Van Allen PLLC; Henry B. Ward, III

(57) ABSTRACT

Embodiments of the invention are directed to pelletized synthetic gypsum and methods and systems for producing pelletized synthetic gypsum. Synthetic gypsum is combined with a binder composition and pelletized to a desired size. The binder composition may include lignosulfonate. Additives may be included in the pellets such as various plant nutrients and micro-nutrients. An additive may include elemental sulfur. The resulting pellets may have a mean pellet size guide number (SGN) from approximately 150 to approximately 300 and a crush strength from approximately 2 lbf to approximately 12 lbf

23 Claims, 4 Drawing Sheets

(56) References Cited

U.S. PATENT DOCUMENTS

2006/0180090 A1* 8/2006 Odom .................. A01N 25/08
119/171
2006/0180091 A1* 8/2006 Odom .................. A01N 25/08
119/171
2009/0273113 A1 11/2009 Baig

OTHER PUBLICATIONS

"Kelly Limestone: Material Safety Data Sheets (MSDS)—Feb. 28, 2012".
"Kelly Limestone: Capsulated Gypsum MSDS—Feb. 28, 2012".
International Search Report and Written Opinion of International Application No. PCT/US2013/054212; mailed date Jan. 17, 2014; 9 pages.
European Search Report for EP Application No. 13827660.5 dated Mar. 15, 2016.

* cited by examiner

SYNTHETIC GYPSUM FERTILIZER PRODUCT AND METHOD OF MAKING

This patent application claims priority to and hereby incorporates by reference the entire contents of U.S. Provisional Patent Application No. 61/681,088 entitled "SYNTHETIC GYPSUM FERTILIZER PRODUCT AND METHOD OF MAKING" filed on Aug. 8, 2012.

BACKGROUND

Industrial process plants for chemical manufacturing and power plants often produce a calcium sulfate by-product or co-product referred to herein as synthetic gypsum. Synthetic gypsum, produced by power plants, sometimes referred to as flue-gas desulfurization ("FGD") gypsum, is a by-product recovered from flue gas streams resulting from the burning of energy sources containing concentrations of sulfur (e.g., coal). Synthetic gypsum is normally produced from scrubbing the flue gas stream with a limestone slurry that will capture the sulfur released from the fuel burned in the boiler. The limestone slurry and captured sulfur can be dewatered to separate the liquids and solids to create a calcium sulfate product that is referred to as "synthetic gypsum".

In contrast to synthetic gypsum, "natural gypsum" is mined from naturally occurring deposits in various regions of the world. In most cases, natural gypsum is formed as sea water evaporates. Capillary action brings saline water to the surface where the salts are precipitated. As such, natural gypsum is generally found in layers formed under salt water. In addition to the wallboard industry and cement manufacturing, natural gypsum is also utilized in agriculture as calcium and sulfur are two key nutrient components needed by plants. More specifically, natural gypsum and can contain calcium sulfate at varying concentrations, usually at less moisture content and lower calcium sulfate purity as compared to synthetic gypsum. Natural gypsum, because of its lower moisture content and free flowing granular form, can be easier to spread with conventional farm equipment. Because natural gypsum has insoluable mineral components and also solubilizes rather slowly, natural gypsum can provide a slow continual release of low level sulfur to the soil for more than just the year it is applied. However, this slow release of sulfur can reduce the availability of the sulfur from natural gypsum when it is needed to promote plant growth, which can be a disadvantage since the sulfur is not readily available and, thus, leaches through the soil without adding nutrients to the plant at the time period when needed.

Synthetic gypsum is unique in that the industrial process from which it is derived causes the calcium sulfate to have a very fine particle size typically in the range of 5 to 150 micron and, therefore, it has greater surface area and retains moisture from the dewatering process. Disadvantageously, fine particle minerals are known to have difficult physical handling properties when they contain moisture causing the materials to stick to material handling equipment and spreading devices. The finer particle size causes the moisture to be difficult to separate from the solid particles. Although FGD systems can generate large quantities of synthetic gypsum products, because of the difficult physical handling properties, only a portion of the synthetic gypsum produced can be beneficially recycled for use in the wallboard industry. Lesser quantities of synthetic gypsum are processed and utilized in the cement manufacturing industry. The remaining synthetic gypsum must be placed in landfills or deposited in surface impoundments. Since the production of synthetic gypsum is rapidly increasing as new scrubbers are added to new or existing power plants in order to comply with federal, state or local air pollution control regulations, a need exists to increase the beneficial uses of synthetic gypsum.

BRIEF SUMMARY

Embodiments of the invention are directed to processing and forming, which can include pelletizing, granulating, or extruding, synthetic gypsum and methods and systems for producing pelletized synthetic gypsum. In a first aspect of the invention, a method of producing a fertilizer is provided. The method includes processing the synthetic gypsum and then discharging the processed synthetic gypsum onto a forming device, which may comprise a pelletizer, granulator, or extruder. The method further includes feeding a binder composition to the processing equipment and/or forming device. Additionally, the method includes pelletizing the material fed to the pelletizer to a mean pellet size guide number ("SGN") from approximately 150 to approximately 300. In some embodiments, the mean pellet SGN is from approximately 250 to approximately 280. The resulting pelletized synthetic gypsum has a crush strength from approximately 2 pound-force ("lbf") to approximately 12 lbf. In another embodiment, the resulting pelletized synthetic gypsum has a crush strength from approximately 3 lbf to approximately 8 lbf. In another embodiment, the resulting pelletized synthetic gypsum has a crush strength from approximately 4 lbf to approximately 6 lbf.

In some embodiments of the method, the synthetic gypsum fed to the forming device has a mean particle size of less than 100 microns.

In some embodiments of the method, the binder composition includes a water soluble binder. In some embodiments, the binder composition includes a water soluble binder that comprises, or is one or more of the group consisting of, brewers condensed solubles, lignosulfonate, sodium carbonate lignin, cane molasses, beet syrup, beet molasses, desugared beet molasses, whey, starch, starch derivatives, soy solubles with cane molasses, hydrolyzed collagen, amino acid solutions, cellulose derivatives, or cellulose based polymer binders. The lignosulfonate may be a calcium lignosulfonate.

In some embodiments, the method further includes feeding an additive to the mixer or to the forming device. The additive can include at least one of finely ground calcium carbonate, calcium bentonite, kaolin clays, manganese, zinc, boron, calcium, copper, and elemental sulfur. In particular embodiments, the additive includes elemental sulfur.

In another aspect of the invention, a fertilizer is provided. The fertilizer includes pellets. The pellets include synthetic gypsum and a binder composition. The pellets have a mean pellet SGN from approximately 150 to approximately 300. In some embodiments the mean SGN is from approximately 250 to approximately 280. The resulting pelletized synthetic gypsum has a crush strength from approximately 2 lbf to approximately 12 lbf. In another embodiment, the resulting pelletized synthetic gypsum has a crush strength from approximately 4 lbf to approximately 8 lbf. In another embodiment, the resulting pelletized synthetic gypsum has a crush strength from approximately 4 lbf to approximately 6 lbf.

In some embodiments of the fertilizer, the binder composition includes a water soluble binder. In some embodiments, the binder composition includes a water soluble binder that comprises, or is one or more of the group consisting of, brewers condensed solubles, lignosulfonate, sodium carbonate lignin, cane molasses, beet syrup, beet molasses, desugared beet molasses, whey, starch, starch derivatives, soy solubles with cane molasses, hydrolyzed collagen, amino acid solutions, cellulose derivatives, or cellulose based polymer binders. The lignosulfonate may be a calcium lignosulfonate.

In some embodiments of the fertilizer, the pellets further include an additive. The additive can include at least one of finely ground calcium carbonate, calcium bentonite, kaolin clays, manganese, zinc, boron, calcium, copper, and elemental sulfur. In particular embodiments, the additive includes elemental sulfur. In particular embodiments, the additive includes elemental sulfur.

In another aspect of the invention, a process for producing a fertilizer is provided. The process includes feeding synthetic gypsum to a dryer, feeding dried synthetic gypsum and a binder composition to a mixer, mixing the material fed to the mixer, feeding the mixed material to a forming device, pelletizing the material fed to the forming device, feeding the pelletized material to a dryer, drying the pelletized material, feeding the dried pelletized material to a screener, and screening the dried pelletized material fed to the screener to a mean pellet SGN from approximately 150 to approximately 300. In some embodiments, the mean SGN is from approximately 250 to approximately 280. The process further includes recycling unders and overs removed during screening to the mixer. The resulting pelletized synthetic gypsum has a crush strength from approximately 2 lbf to approximately 12 lbf. In another embodiment, the resulting pelletized synthetic gypsum has a crush strength from approximately 3 lbf to approximately 8 lbf. In another embodiment, the resulting pelletized synthetic gypsum has a crush strength from approximately 4 lbf to approximately 6 lbf.

In some embodiments of the process, the synthetic gypsum fed to the mixer has a mean particle size of less than 100 microns.

In some embodiments of the process, the binder composition includes a water soluble binder. In some embodiments, the binder composition includes a water soluble binder that comprises, or is one or more of the group consisting of, brewers condensed solubles, lignosulfonate, sodium carbonate lignin, cane molasses, beet syrup, beet molasses, desugared beet molasses, whey, starch, starch derivatives, soy solubles with cane molasses, hydrolyzed collagen, amino acid solutions, cellulose derivatives, or cellulose based polymer binders. The lignosulfonate may be a calcium lignosulfonate.

In some embodiments, the process further includes feeding an additive to the mixer. The additive can include at least one of finely ground calcium carbonate, calcium bentonite, kaolin clays, manganese, zinc, boron, calcium, copper, and elemental sulfur. In particular embodiments, the additive includes elemental sulfur.

BRIEF DESCRIPTION OF THE DRAWINGS

Figure 1A:
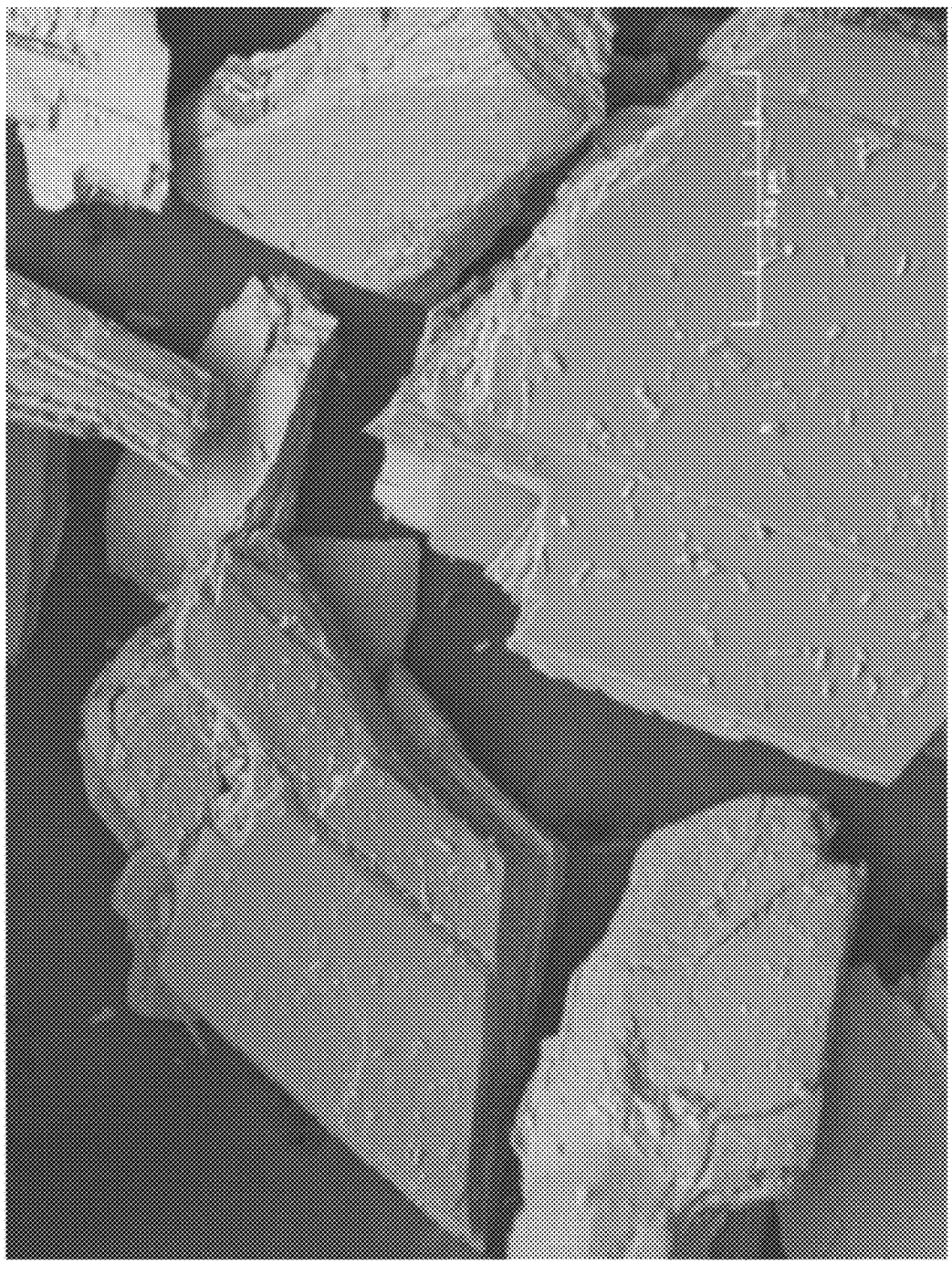
Figure 1B:
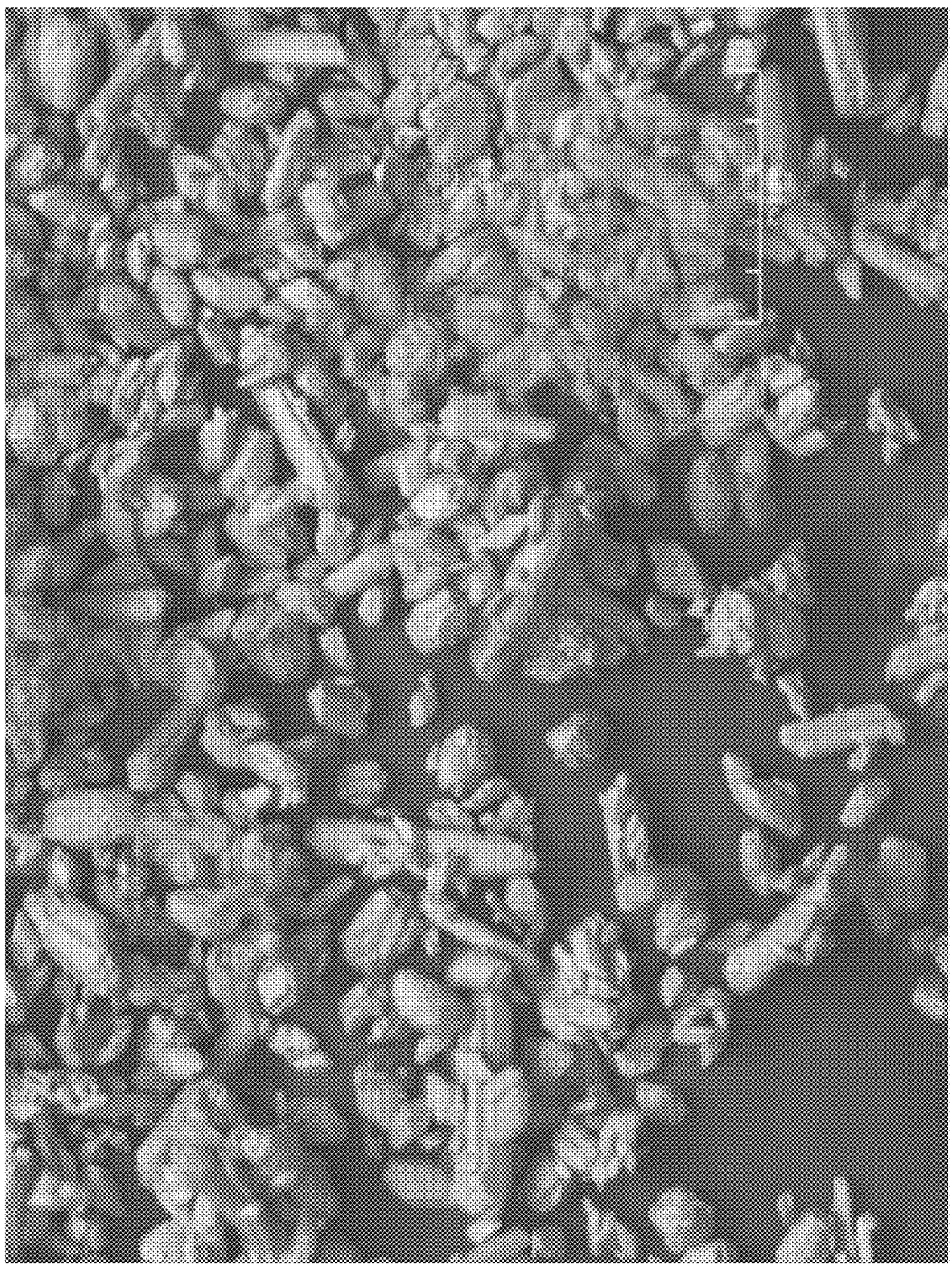
Figure 2:
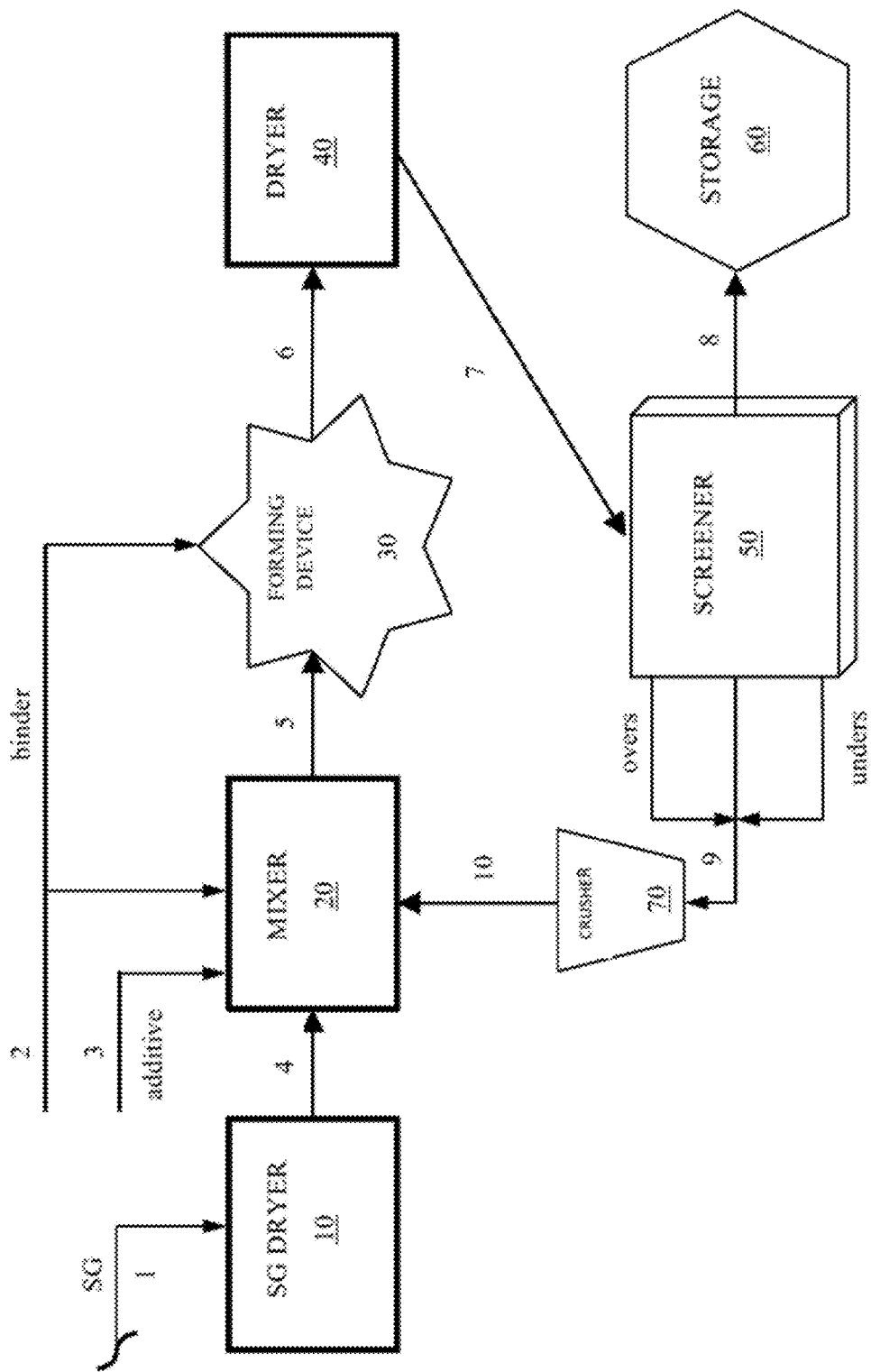

Having thus described embodiments of the invention in general terms, reference will now be made to the accompanying drawings, where:

FIG. 1A is a 100 times magnification illustration of natural gypsum, in accordance with embodiments of the present invention;

FIG. 1B is a 100 times magnification illustration of synthetic gypsum, in accordance with embodiments of the present invention; and FIG. 2 illustrates a process for pelletizing synthetic gypsum, in accordance with embodiments of the present invention.

Figure 3:
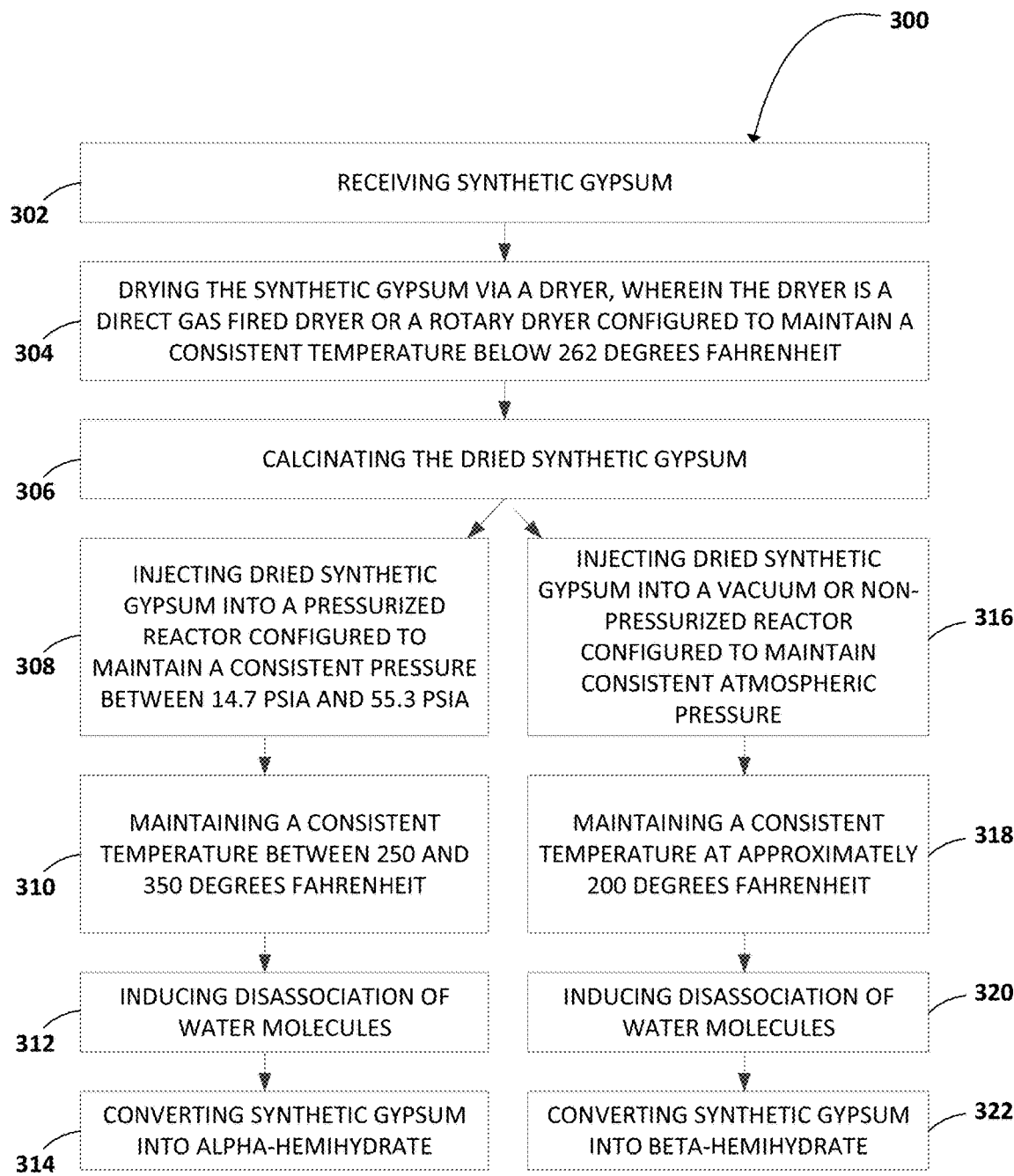

FIG. 3 illustrates two (2) processes for drying synthetic gypsum, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Synthetic gypsum is generally produced in limestone-forced oxidation scrubbers that remove sulfur dioxide from the flue gas stream after coal combustion. In general, a wet scrubbing process first exposes the flue gases to a slurry of hydrated lime. The lime slurry is formed by grinding limestone to a small particle size and combining the powdered limestone with water to make a mixture that can be pumped at regulated flow rates to the scrubber equipment. Capture of sulfur by the lime slurry occurs in an absorber vessel and initially forms calcium sulfite ($CaSO_3.0.5H_2O$). The scrubber slurry is then transferred to a storage tank where the aeration occurs. Forcing additional air into the system oxidizes the calcium sulfite and converts it into gypsum, i.e., $CaSO_4.2H_2O$ that results in solids concentration. The higher solids gypsum is pumped to a dewatering system. At the dewatering portion of the gypsum handling process the gypsum is dewatered and washed to remove water-soluble salts and elements such as sodium chlorides, potassium chlorides and boron (B). Dewatering can also take place during the oxidation process. Generally, the final step of the gypsum production process involves partial removal of water by a combination of centrifugation and vacuum filtration so that the synthetic gypsum as a moisture content of approximately 6% to approximately 16%. The synthetic gypsum that is recovered is high quality and suitable for various industrial (e.g., wallboard) uses. As noted above, the supply of synthetic gypsum is increasing due to more stringent environmental regulations coupled with the addition of new equipment at coal-fired power plants.

While synthetic gypsum and natural gypsum generally have similar chemical properties (i.e., calcium and sulfur percentage compositions), synthetic gypsum cannot be effectively utilized in the agriculture industry due to its difficult material handling properties. Synthetic gypsum and natural gypsum have other material differences. Synthetic gypsum typically has a higher purity of CaSO4 in comparison to natural gypsum. Synthetic gypsum production also yields much smaller particle sizes than the natural gypsum that is mined. Most synthetic gypsum has a particle size less than 250 microns and often includes particle sizes less than 200 microns, less than 150 microns, less than 100 microns, and even less than 50 microns. Indeed, most synthetic gypsum has particle sizes in the range of approximately 5-150 microns. FIG. 1A illustrates a 100× magnification of typical natural mined gypsum. By comparison, FIG. 1B illustrates a 100× magnification of typical synthetic gypsum. As illustrated, synthetic gypsum obtained is generally multiple orders of magnitude smaller than natural mined gypsum. As an example, an analysis of synthetic gypsum from a power plant in Ohio (which is typical of synthetic gypsum) in comparison with natural gypsum mined in Ohio produced the following results:

TABLE 1

Comparison of Synthetic Gypsum and
Natural Gypsum Particle Size

| Particle Size | Synthetic Gypsum (%) | Natural Gypsum (%) |
|---|---|---|
| >250 microns | 0.14 | 100 |
| 150-250 microns | 3.2 | 0 |
| 105-150 microns | 33 | 0 |
| 74-105 microns | 33 | 0 |
| <74 microns | 31 | 0 |

Due to the small particle sizes of synthetic gypsum, its moisture retention and resultant difficulty in material handling, agricultural applicability is minimal due to difficulties of feeding synthetic gypsum through spreading equipment onto or into the soil. Within the agriculture industry typical spreading equipment are designed to handle granular materials and are not capable of spreading such small particles that stick together. Synthetic gypsum, if it could be effectively spread as an agricultural product, is a soluble source of the essential plant nutrients, calcium and sulfur, that would improve overall plant growth and also would improve the physical properties of some soils (especially heavy clay soils). Advantageously, the present invention provides a pelletized, granulated, or extruded synthetic gypsum that will promote soil aggregation and, thus, will (1) help prevent dispersion of soil particles, (2) reduce surface crust formation, (3) promote seedling emergence, and (4) increase water infiltration rates and movement through the soil profile. The pelletized, granulated, or extruded synthetic gypsum of the present invention also reduces erosion losses of soils and nutrients and reduce concentrations of soluble phosphorus in surface water runoff. Chemical properties improved by application of the pelletized, granulated, or extruded synthetic gypsum of the present invention include the mitigation of subsoil acidity and aluminum toxicity. This enhances deep rooting and the ability of plants to take up adequate supplies of water and nutrients during drought periods. The pelletized, granulated, or extruded synthetic gypsum of the present invention can also be used for sodic soil reclamation and can also be included as a component in synthetic soils for nursery, greenhouse, and landscape use.

Embodiments of the present invention are directed to reducing the moisture content and increasing the particle size of synthetic gypsum and improving its ease of spreading while maintaining the beneficial properties. Significant properties of pelletized synthetic gypsum for use as fertilizer include particle size and crush strength. Desirable particle sizes in some embodiments have a mean pellet SGN of approximately 100 to approximately 500, in some embodiments from approximately 100 to approximately 300, in some embodiments from approximately 150 to approximately 300, in some embodiments from approximately 200 to approximately 300, in some embodiments from approximately 250 to approximately 350, and in some embodiments from approximately 250 to approximately 280. SGN is utilized generally in the fertilizer industry and is simply the diameter of the median granule size and is expressed in millimeters multiplied by 100. For example, a measurement of an SGN of 250 would correspond to a median granule size of 2.50 millimeters. Desirable crush strengths in some embodiments are from approximately 1 lbf to approximately 12 lbf, in some embodiments from approximately 2 lbf to approximately 10 lbf, in some embodiments from approximately 2 lbf to approximately 8 lbf, in some embodiments from approximately 3 lbf to approximately 8 lbf, in some embodiments greater than 2 lbf, in some embodiments greater than 3 lbf, and in some embodiments greater than 5 lbf. Another desirable measure of crush strength is the ability of the synthetic gypsum pellets of the present invention to substantially maintain integrity when being spread using an approximately 700 rotation per minute ("rpm") impeller up to an approximately 800 rpm impeller. Advantageously, such the synthetic gypsum pellets of the present invention are capable of being spread from approximately 60 feet to 100 feet, or in other embodiments, 70 feet to 90 feet or in still other embodiments 80 feet to 100 feet.

In order to achieve desired physical properties of the pellet, one or more binder additives may be utilized. In one embodiment, the binder composition includes a water soluble binder. In some embodiments, the binder composition includes a water soluble binder that comprises, or is one or more of the group consisting of, brewers condensed solubles, lignosulfonate, sodium carbonate lignin, cane molasses, beet syrup, beet molasses, desugared beet molasses, whey, starch, starch derivatives, soy solubles with cane molasses, hydrolyzed collagen, amino acid solutions, cellulose derivatives, or cellulose based polymer binders. The lignosulfonate may be a calcium lignosulfonate.

Lignosulfonates, which are water-soluble anionic polyelectrolyte polymers. Lignosulfonates may vary in molecular mass from about 1,000 to about 140,000. An exemplary lignosulfonate is Norlig A™ calcium lignosulfonate solution supplied by LignoTech USA, Houston, Tex. In some embodiments, it is desirable for the amount (wt. %) of lignosulfonate in the final pellet to be at least approximately 1%, in some embodiments from approximately 1% to approximately 5%, and in some embodiments approximately 2%.

FIG. 2 illustrates one embodiment of a process for forming synthetic gypsum pellets. Synthetic gypsum is inputted into a dryer 10, through feed line 1, to reduce the moisture content and then introduced into a mixer 20, such as a paddle/pin via feed line 4. A binder is introduced to the mixer 20 via feed line 2. Additional additives (if desired) may be introduced via feed line 3. A recycle line 10 may also input material into the mixer 20. While FIG. 2 illustrates separate feed lines, it will be appreciated that the components may be input separately through the same feed line(s) or at the same time through the same feed line(s). While a paddle/pin mixer 20 is described, it will be appreciated that any suitable mixer type may be utilized to mix the synthetic gypsum, binder, and optional additional additives.

In one embodiment, a pin mixer is used in which dried synthetic gypsum having a density of 50 lbs/ft$^3$ to 65 lbs/ft$^3$ is fed at a rate of approximately 10 tons per hour ("tph") to approximately 18 tph. A binder of lignosulfonate having 18% to 48% solids is fed into the pin mixer at a rate of approximately 1 gallon per minute ("gpm") to approximately 8 gpm at a pressure of 35 psi to 55 psi. The spray location in one embodiment is +2, −6. The pin mixer mixes the contents at a speed of 250 rpm to 480 rpm and, in one embodiment, at 278 rpm. The synthetic gypsum mixture exits the pin mixture with a moisture content of 4% to 8%.

Regarding the drying step, synthetic gypsum may be converted into one of two hemihydrate forms of calcium sulfate ($CaSO_4 \cdot \frac{1}{2}H_2O$) through a series of one or more drying processes. FIG. 4 illustrates a general process flow for executing the conversion of synthetic gypsum into hemihydrate. First, the synthetic gypsum may be dried. The purpose of drying the synthetic gypsum may be to remove free moisture from the raw material. Drying the synthetic gypsum may reduce its weighted moisture content from a typical range of approximately 6% to approximately 16% to less than approximately 1%. In some embodiments, a direct gas fired dryer or a rotary dryer may be utilized to dry the synthetic gypsum. The dryer may be configured to maintain a consistent temperature below the gypsum calcining temperature, the point at which dissociation of combined water begins to take place, of approximately 262° F. In one embodiment, the synthetic gypsum is dried in a direct gas fired flash dryer at approximately 100° F. for approximately 2 to 20 seconds and, more preferably, 2 to 12 seconds.

In one optional embodiment, the dried synthetic gypsum may then be calcinated, a heating process wherein calcium sulfate is converted into hemihydrate through the disassociation of water molecules. Calcination may be performed, for example, by flash drying at high temperatures, cooking in large kettles, heating in furnaces or rotary kilns, using steam, cooking in aqueous suspensions, or the like. Typically, two types of hemihydrate can be formed from dried synthetic gypsum, namely alpha-hemihydrate and beta-hemihydrate.

Alpha-hemihydrate may be obtained by calcinating synthetic gypsum in a pressurized environment. Synthetic gypsum may be injected into a pressurized reactor configured to maintain a typical pressure range of 14.7 psia (1 atmosphere) to 55.3 psia (3.8 atmospheres). A fluid, such as pressurized air, steam, water, or combustion gases, may be injected into the reactor for creating a fluidized bed of gypsum, controlling humidity in the reactor, and/or for heating purposes. The temperature within the reactor may be monitored or controlled to maintain a temperature range from approximately 250° F. to 350° F. with a preferred temperature for inducing the disassociation of water molecules being between 280° F. and 300° F. Typically, the temperature is raised above 262° F., but kept below 325° F., to ensure that no other types of calcium sulfates are formed.

Beta-hemihydrates may be obtained by calcinating synthetic gypsum in a similar process as described above. However, to obtain beta-hemihydrates, the calcination process may occur in a vacuum environment, or at atmospheric pressure (e.g., 1 atmosphere). Typically, the temperature is maintained at or near 200° F. to induce the disassociation of water molecules.

Upon the disassociation of water molecules, the calcinated synthetic gypsum may be converted into alpha- or beta-hemihydrate forms of calcium sulfate. In some embodiments, the calcination process may include multiple calcinations. Multiple calcinations may strengthen the hemihydrate product. In other embodiments, other temperature and/or pressure ranges may be used to convert the synthetic gypsum into hemihydrate, and the calcination process may be conducted over a predetermined period of time or on a time schedule.

FIG. 3 illustrates a general process flow for the conversion of synthetic gypsum into hemihydrate. At block 302, the process includes receiving synthetic gypsum. At block 304, the process includes drying the synthetic gypsum via a dryer, wherein the dryer is a direct gas fired dryer or a rotary dryer configured to maintain a consistent temperature below 262° F. At block 306 the process includes calcinating the dried synthetic gypsum, wherein calcinating the dried synthetic gypsum includes one of two processes.

To generate alpha-hemihydrate, at block 308, the process includes injecting the dried synthetic gypsum into a pressurized reactor configured to maintain a consistent pressure between 14.7 and 55.3 psia (between 1 and 3.8 atmospheres). At block 310, the process includes maintaining a consistent temperature between 250° F. and 350° F. At block 312, the process includes inducing the disassociation of water molecules in the synthetic gypsum. At block 314, the process includes converting the synthetic gypsum into alpha-hemihydrate.

To generate beta-hemihydrate, at block 316 the process includes injecting the dried synthetic gypsum into a vacuum or non-pressurized reactor configured to maintain consistent atmospheric pressure. At block 318, the process includes maintaining a consistent temperature at approximately 200° F. At block 320, the process includes inducing the disassociation of water molecules in the synthetic gypsum. At block 322, the process includes converting the synthetic gypsum into beta-hemihydrate.

While not illustrated in FIG. 2, it may be desirable to exclude a drying step for the synthetic gypsum prior to input into the mixer 20. Typically, synthetic gypsum produced has a moisture content of greater than about 6%, and in some embodiments from approximately 8% to approximately 16%. In some embodiments, it is desirable to dry the synthetic gypsum to a moisture content of less than about 10%, in some embodiments less than about 7%, in some embodiments, less than about 5%, in some embodiments less than about 3%, and in some embodiments less than about 1%. In some embodiments, the synthetic gypsum is dried to approximately 1% moisture content prior to mixing/pelletizing.

Once mixed, the material exits the mixer 20 via line 5 and enters the forming device 30. The forming device 30 may comprise a pelletizer, a granulator or an extruder. As used herein, a "pellet" means a fertilizer product made by a pelletizer, granulator, or extruder. The pelletizer may be any type of pelletizer such as disc/pan pelletizer, flat die pelletizer, ring die pelletizer, screw press pelletizer, hydraulic pelletizer, or the like. In other embodiments a granulator or extruder may be used instead of a pelletizer. Additional binder may be introduced to the forming device 30 via line 2 if necessary. Typically, the binder is introduced into the forming device 30 via a spray system so as to conduct the addition of the binder in as uniform manner as possible.

In one embodiment, a pelletizer is used in which mixed synthetic gypsum is fed at a rate of approximately 10 tph to approximately 18 tph. The feed location in one embodiment is +2, −3. A binder of lignosulfonate having 18% to 48% solids is fed into the pelletizer at a rate of approximately 1 gallon per minute ("gpm") to approximately 8 gpm at a pressure of 35 psi to 55 psi. The spray location in one embodiment is +2, −6, −3, −10, −2, −8. The pelletizer pelletizes the mixed synthetic gypsum and binder using a pan rate of 5 rpm to 12 rpm at an angle of 50 degrees to 68 degrees. The synthetic gypsum pellets exit with a moisture content of 4% to 12%.

After pellet formation, the pellets exit the forming device 30 via line 6 and enter dryer 40 to remove excess moisture. The dryer 40 may be any type of dryer such as a rotary dryer, fluid bed dryer, drum dryer, or the like. Once the pellets have been dried, they exit the dryer 40 via line 7 and enter a screener 50. The screener acts to screen out pellets that are too large or too small as desired. Typical screeners include vibrating screeners, rotary screeners, and the like. The final product exits the screener via line 8 to storage container 60. Overs (i.e., pellets larger than specification) and unders (i.e., pellets smaller than specification) exit the screener and may be recycled to the mixer 20 via line 10. Typically, the overs and unders are first introduced to a crusher, such as a hammermill, 70 via line 9 prior to recycling back to the mixer 20.

In some embodiments, it may be desirable to add a micronutrient mix to the synthetic gypsum for an improved fertilizer product. It is contemplated that any material may be added to the synthetic gypsum prior to forming depending upon the desired final product. Non-limiting example additives include calcium carbonate, kaolin clays, zinc, manganese, iron, copper, boron, carbon, chromium, lime, and humic acid. One exemplary additive is Wolf Trax Cropmix DDP available from Wolf Trax Inc., Winnipeg, Manitoba, Canada. Cropmix DDP contains 2% boron, 1% copper, 1% iron, 18% manganese, and 17% zinc.

In some exemplary embodiments, elemental sulfur is utilized as an additive. The use of elemental sulfur provides unique benefits to the fertilizer product. As noted above, sulfur is an important nutrient needed by plants. However, sulfur is only absorbed by plant-life in sulfate ($SO_4$) form. Elemental sulfur, when added to the soil, will slowly oxidize into sulfate form. The rate of oxidation may vary due to numerous factors such as microbiological population of the soil, the physical properties of the elemental sulfur source, and environmental conditions of the soil including temperature, soil moisture and aeration, soil pH, and fertility status of the soil. As elemental sulfur slowly oxidizes, it provides a continuous supply of sulfate to the plants. As such, a fertilizer that includes synthetic gypsum with elemental sulfur as an additive has the beneficial property of a "fast release" sulfate in the form of the synthetic gypsum with a continuous slow release of sulfate from the oxidation of elemental sulfur.

In some embodiments, the resulting pellet is particularly soluble in water. A benefit to the small raw material particle size of synthetic gypsum is the ease of dissolving the pellets into water. As noted above, some agricultural uses include applying synthetic gypsum in aqueous solution and sprayed to the plants. As such, the pelletized synthetic gypsum has the benefit of spreadability via conventional fertilizer spreaders as well as solubility in order to utilize the synthetic gypsum in solution with water.

EXAMPLES

Example 1

Pelletization testing was conducted on synthetic gypsum with an objective to produce synthetic gypsum pellets demonstrating approximately 0.1 percent attrition loss and 5.9 pounds average compression strength, with an approximate 92 percent minus 4× plus 20 mesh fraction and about 85 percent in the minus 6× plus 16 mesh range. Approximately 30 gallons of dried synthetic gypsum was tested. Norlig A™ calcium lignosulfonate solution was supplied by LignoTech USA as liquid binder additive.

The synthetic gypsum was analyzed for moisture content and bulk density (see table 2).

TABLE 2

| | Processed Material Properties | | |
|---|---|---|---|
| Processed Material | Moisture Content | Density (aerated) lbs/ft$^3$ | Density (compacted) lbs/ft$^3$ |
| synthetic gypsum | 1.5% | 51.3 | 73.2 |

A Mars Mineral 8D32L Pin Mixer was utilized for testing the synthetic gypsum, using 25:75 Norlig A™ calcium lignosulfonate solution to water as liquid binder (see table 3).

A pin mixer is a high speed, conditioning and micro-pelletizing device that converts powders into small agglomerates through the action of a high speed rotor shaft and pin assembly and the addition of liquids such as water, binders, oil or surfactants. The 8D32L Pin Mixer has an 8" diameter by 32" long mixing chamber, with two available binder nozzle ports. Its maximum feed throughput is 10 cubic feet per hour.

For each test run, the first port was used for liquid binder addition. The first two numbers of the nozzle tip size represent the angle of the flat spray. The second two numbers indicate the flow rate. The 4001 nozzle tip has the capability of applying 0.1 gallons of water per minute in a 40 degree spray pattern at 40 psi. Test parameters and conditions for the pin mixer operation are tabulated below (see table 3).

TABLE 3

| 8D32L Pin Mixer Parameters and Conditions | | | | | | | | | | | | |
|---|---|---|---|---|---|---|---|---|---|---|---|---|
| | Feed | | | 25:75 Norlig A ™ to Water | | | Pin Mixer | | | | GP | |
| Test Run | Rate ft$^3$/hr | lbs/min | Nozzle tip | p PSI | Rate gal/min | lbs/min | f RPM | I A | % F | P HP | T ° F. | MC % | ABD lbs/ft$^3$ |
| 1 | 6.7 | 5.75 | 4001 | 3 | 0.03 | 0.23 | 1500 | 31 | 63% | 12 | 122 | 5.4 | 46.3 | p = pressure;
f = rotational frequency;
I = current;
% F = per cent full load current;
P = power;
GP = green pellet;
T = temperature;
MC = moisture content;
ABD = aerated bulk density A Mars Mineral DP-14 bench scale disc pelletizer was utilized for further testing the 8D32L Pin Mixer discharge, also using 25:75 Norlig A™ calcium lignosulfonate solution to water as liquid binder (see table 3).

A disc pelletizer is an inclined, slowly spinning pan that rolls particulates into agglomerates. Both angle and speed are adjustable to control movement of the material. The growth of a pellet is similar to that of a snowball rolling down a hill, gaining size as it goes. Pellet size is manipulated by binder spray location, material feed location, pan speed and pan angle. Since gravity is the central force involved, disc pelletizers are efficient machines.

The DP-14 Agglo-Miser has a 14" diameter pan, the depth of which can be adjusted to 3", 6" or 9". Feed material and liquid binder are added manually to model automated systems utilized on larger scale discs or drums. For disc pelletization, the DP-14 pan depth was adjusted to 3"

The DP-14 disc was operated at the parameters indicated below (see table 4). Liquid binder was applied to the feed material in the pan by means of a plastic spray bottle.

TABLE 4

DP-14 Disc Parameters

| Test Run | Feed ID | MC % | Position clock | 25:75 NA to W Application clock | in. to p | Pan f RPM | Tilt ° | GP MC % | ABD lbs/ft³ |
|---|---|---|---|---|---|---|---|---|---|
| 1A | Run 1 Discharge | 4.0 | 5 | 5 | 5 | 32 | 57 | 9.0 | 61.7 |

MC = moisture content;
NA = Norlig A ™ calcium lignosulfonate;
W = water;
in. to p = inches from pan perimeter;
f = rotational frequency;
GP = green pellet;
ABD = aerated bulk density Representative green pellets from test run 1A were dried in an 80° C. convection oven and analyzed for moisture content, bulk density, attrition loss, compression strength (see table 4), and particle size (see table 5). A Mettler Toledo HR83-P Moisture Analyzer, set at 80° C., standard (constant temperature) drying program and switch-off criterion 5 (i.e., 1 mg per 140 seconds), was utilized. Bulk density analysis was conducted on the pellets, as discharged. Attrition analysis measured percent losses of minus 10× plus 16 mesh pellets after 5 minutes on a 45 mesh screen in a Ro-Tap® test sieve shaker. Compression strength analysis was conducted on ⅛ inch diameter pellets.

Representative pin mixer discharge from test run 1, as fed to the DP-14 disc, was dried in an 80° C. convection oven and analyzed by for moisture content, bulk density (see table 4), and particle size (see table 6).

TABLE 5

Pellet Properties

| Test Run | Pelletizer Model(s) | % NA Solids in DP | % NA Solids in AP | AP % MC | Bulk Density (aerated) lbs/ft³ | Bulk Density (compacted) lbs/ft³ | % Attrition Loss | Compression intact @ n lbs |
|---|---|---|---|---|---|---|---|---|
| 1A | 8D32L to DP-14 | 1.5% | 1.5% | 0.1% | 57.0 | 63.8 | 0.7% | 3.7 |
| 1 | 8D32L | 0.6% | 0.6% | 0.1% | 54.4 | n/a | n/a | n/a |

NA = Norlig A ™ calcium lignosulfonate;
DP = (theoretically) dry pellets having 0.0% moisture content;
AP = actual pellets as analyzed;
MC = moisture content

TABLE 6

Pellet Size

Run 1A
8D32L to DP-14
1.5% Norlig A Solids
0.1% Moisture Content

| Sieve | Retained | Cumulative |
|---|---|---|
| 4 mesh | 0.7% | 0.7% |
| 6 mesh | 0.4% | 1.1% |
| 10 mesh | 32.5% | 33.5% |
| 16 mesh | 62.1% | 95.6% |
| 20 mesh | 2.4% | 98.0% |
| 30 mesh | 0.1% | 98.1% |
| Pan | 1.9% | 100.0% |
| 96.3% −4 X +20 mesh | | |
| 93.6% −6 X +16 mesh | | |

TABLE 7

DP-14 Disc Feed Particle Size

Run 1 Discharge
0.6% Norlig A Solids
0.1% Moisture Content

| Sieve | Retained | Cumulative |
|---|---|---|
| 16 mesh | 10.5% | 10.5% |
| 20 mesh | 5.8% | 16.3% |
| 45 mesh | 14.6% | 30.9% |
| 80 mesh | 23.9% | 54.8% |
| 120 mesh | 17.0% | 71.7% |
| 200 mesh | 17.1% | 88.8% |
| Pan | 11.2% | 100.0% |

Pellets matching the size requirement and nearly matching the durability requirement were made from the low moisture synthetic gypsum, utilizing 25:75 Norlig A™ calcium lignosulfonate solution to water as liquid binder, with a Mars Mineral DP-14 Disc Pelletizer, fed with discharge from a Mars Mineral 8D32L Pin Mixer (see tables 2 and 3). These pellets exhibited 0.7 percent attrition loss and 3.7 pounds average compression strength (see table 4). Ninety six percent of the pellets, as discharged from the disc pelletizer, were in the minus 4× plus 20 mesh fraction, and nearly 94 percent were in the minus 6× plus 16 mesh range (see table 5).

Example 2

Synthetic gypsum sludge with 20% moisture was dried to a 1% moisture powder. Two parts dried gypsum were blended with one part sludge for a hand mix feed material with 7.5% moisture. Two (2) lbs of hand blended material was fed to a pin mixer with 0.2 lbs. lignosulfonate with 40% solids. The blended material with addition of the lignosulfonate was a wet fluff with no agglomerated particles and 8.5% final discharge moisture.

The blended material was discharged from the pin mixer to a pan pelletizer and sprayed with the same solution of 40% solids lignosulfonate as the material rotated around the pan pelletizer.

Small seed pellets formed and grew uniformly across the pan pelletizer to 5-10 mesh in size. Dried crush strength was measured to be 3-3.5 lbs. It is believed that a higher ratio of dried synthetic gypsum to sludge may increase crush strength by allowing for increased amounts of lignosulfonate in the final dried pellets.

Example 3

12% moisture synthetic gypsum and dried synthetic gypsum (1% moisture) was tested. In a first run a 50/50 mix of dry and wet synthetic gypsum was sprayed with lignosulfonate with 2% solids. During the addition of lignosulfonate, the mixture turned to a mud-like consistency and failed to granulate.

In a second run, 2500 g of dry gypsum and 2% solids lignosulfonate (94 g) mixed with 100 g. of water was tested. The product granulated very well and the final crush strength of the pellets were between 3 lbf and 8 lbf.

In a third run, 12% moisture synthetic gypsum was combined with an equal amount of bentonite clay. With addition of 2% solids lignosulfonate, the product granulated very well and pellets with a crush strength of 8 lbf and 18 lbf was obtained.

While the present invention has been described in connection with the exemplary embodiments thereof, it will be understood that any modification will be apparent to those of ordinary skill in the art and that this application is intended to cover any adaptations or variations thereof. Therefore, it is intended that this invention be limited only by the claims and equivalents thereof.

Example 4

Full Scale Testing: Synthetic gypsum was dried from 8%, 10% 12% 14% and 16% moistures to less than 2% moisture. Dried gypsum was subsequently combined with 1% to 5% calcium bentonite in powder form to create a powder mixture that was fed to a mixer where a binder and water were added. The addition of binder liquid concentration varied between 25% and 65% binder and 75% and 35% water. At the mixer the addition of liquid varied between 1% and 14% of the solids by weight. Once thoroughly mixed, the mixture was discharged onto a pelletizer where the agglomeration process results in pellets of various size ranges from less than 500 micron diameter to 50 mm (2 inch) diameter. Once the pellets are formed to a desired size range, the pellets are routed to a dryer where the free moisture content is reduced to 0% to 4% by weight. The dried pellets are then processed through the screening equipment and crushers to attain the desired SGN range.

In some instances the pellets are dried to a moisture content that varies between 0% and 2.5% to cure the pellet. Strengths of the pellet are adjusted based on the binder concentrations and point where the binder is applied. In some circumstances the binder is added and the mixer from 1% to 10% of the solids weight and in some instances the binder is added on the pan pelletizer at 1% to 10% of the solids weight.

In one variation of the process, ground calcium carbonate powder is added to the synthetic gypsum to increase the weight of pellets and to improve pelletization process. Ground calcium carbonate is added at concentrations between 1% to 5% by weight prior to the mixer in order to improve the pellet formation. The ground calcium carbonate powder is ground to a size that has a minimum of 90% passing a 325 mesh screen in order for the powder to enhance the pellet formation and improve pellet growth on the pan pelletizer.

In one embodiment the recycle concentration is increased from 2% to 40% to improve the pellet strengths. Recycled pellets are crushed to a size of 1 mm or less and then added to the dried gypsum prior to mixing in the pin mixer. The combination of recycled pellets and dried gypsum are then mixed with an adjusted binder concentration to reach 1% to 10% binder with the binder fluid added at both the mixer and on the pan at various concentrations from 1% to 8% at each location.

Example 5

Tests have also been conducted spread width of pelletized synthetic gypsum according to the present invention. In one embodiment, 100 lbs of synthetic gypsum pellets having a SGN of 360 and a hardness of 2.5 kg (5.5 pounds) was fed through a feedgate having a 2 inch diameter to a spreader having a fan frame of 3.50 inches to 3.75 inches with fin settings of 1-2-1-2 spinning at speeds of 700 rpm, 750 rpm and 800 rpm. Wind conditions were north-north-west at 8 miles per hour ("mph"). The vehicle carrying the spreader was traveling at 15 mph. Under these conditions, the spread was 70 feet to 78 feet.

Example 6

Tests have also been conducted spread width of pelletized synthetic gypsum according to the present invention. In one embodiment, 100 lbs of synthetic gypsum pellets having a SGN of 299 and a hardness of 1.5 kg (3.3 pounds) was fed through a feedgate having a 2 inch diameter to a spreader having a fan frame of 3.50 inches to 3.75 inches with fin settings of 1-2-1-2 spinning at speeds of 700 rpm and 750 rpm. Wind conditions were north-north-west at 8 miles per hour ("mph"). The vehicle carrying the spreader was traveling at 15 mph. Under these conditions, the spread was 65 feet to 75 feet.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method of producing a fertilizer comprising:
   feeding synthetic gypsum to a forming device;
   feeding a binder composition comprising lignosulfonate having 18% to 40% solids to the forming device; and
   forming the material fed to the forming device to a mean pellet size guide number (SGN) from approximately 100 to approximately 500, wherein the resulting pelletized synthetic gypsum has a crush strength from approximately 2 lbf to approximately 12 lbf.

2. The method of claim 1, wherein the synthetic gypsum fed to the forming device has a mean particle size of less than 100 microns.

3. The method of claim 1, wherein the binder composition comprises a water soluble binder.

4. The method of claim 1, wherein the binder composition also comprises one or more binders selected from the group consisting of brewers condensed solubles, sodium carbonate lignin, cane molasses, beet syrup, beet molasses, desugared beet molasses, whey, starch, starch derivatives, soy solubles with cane molasses, hydrolyzed collagen, amino acid solutions, cellulose derivatives, and cellulose based polymer binders.

5. The method of claim 1, further comprising feeding an additive to the forming device, wherein the additive is selected from the group consisting of ground calcium carbonate, calcium bentonite, kaolin clays, manganese, zinc, boron, calcium, copper, and elemental sulfur.

6. The method of claim 5, wherein the additive comprises elemental sulfur.

7. The method of claim 1, wherein the mean SGN is from approximately 250 to approximately 280.

8. The method of claim 1, wherein the forming device comprises a pelletizer.

9. The method of claim 1, wherein the forming device comprises a granulator or an extruder.

10. A fertilizer made by the method of claim 1.

11. A fertilizer comprising:
    pellets, the pellets comprising synthetic gypsum and a binder composition comprising lignosulfonate, wherein the binder composition initially has 18% to 40% solids at the time of contact with the synthetic gypsum, the pellets further comprising mean pellet SGN from approximately 100 to approximately 500, wherein the pellets have a crush strength from approximately 2 to approximately 12 lbf.

12. The fertilizer of claim 11, wherein the binder composition comprises a water soluble binder.

13. The fertilizer of claim 11, wherein the binder composition also comprises one or more binders selected from the group consisting of brewers condensed solubles, sodium carbonate lignin, cane molasses, beet syrup, beet molasses, desugared beet molasses, whey, starch, starch derivatives, soy solubles with cane molasses, hydrolyzed collagen, amino acid solutions, cellulose derivatives, and cellulose based polymer binders.

14. The fertilizer of claim 11, wherein the pellets further comprise an additive, wherein the additive is selected from the group consisting of ground calcium carbonate, calcium bentonite, kaolin clays, manganese, zinc, boron, calcium, copper, and elemental sulfur.

15. The fertilizer of claim 11, wherein the pellets further comprise an additive comprising elemental sulfur.

16. The fertilizer of claim 11, wherein the mean SGN is from approximately 250 to approximately 280.

17. A process for producing a fertilizer comprising:
    feeding synthetic gypsum to a dryer;
    feeding dried synthetic gypsum and a binder composition comprising lignosulfonate having 18% to 40% solids to a mixer;
    mixing the material fed to the mixer;
    feeding the mixed material to a forming device;
    pelletizing the material fed to the forming device;
    feeding the pelletized material to a dryer;
    drying the pelletized material;
    feeding the dried pelletized material to a screener; and
    screening the material fed to the screener to a mean pellet size guide number (SGN) from
    approximately 100 to approximately 500, wherein the resulting pelletized synthetic gypsum has a crush strength from approximately 2 lbf to approximately 12 lbf.

18. The process of claim 17, further comprising recycling unders and overs removed during screening to the mixer.

19. The process of claim 17, wherein the synthetic gypsum fed to the mixer has a mean particle size of less than 100 microns.

20. The process of claim 17, further comprising feeding an additive to the mixer, wherein the additive is selected from the group consisting of manganese, zinc, boron, calcium, copper, and elemental sulfur.

21. The process of claim 17, further comprising feeding an additive to the mixer, wherein the additive comprises elemental sulfur.

22. The process of claim 17, wherein the mean SGN is from approximately 250 to approximately 280.

23. A fertilizer made by the process of claim 17.

* * * * *